W. C. PERKINS.
Improvement in Machines for Jointing Staves.
No. 130,819.            Patented Aug. 27, 1872.
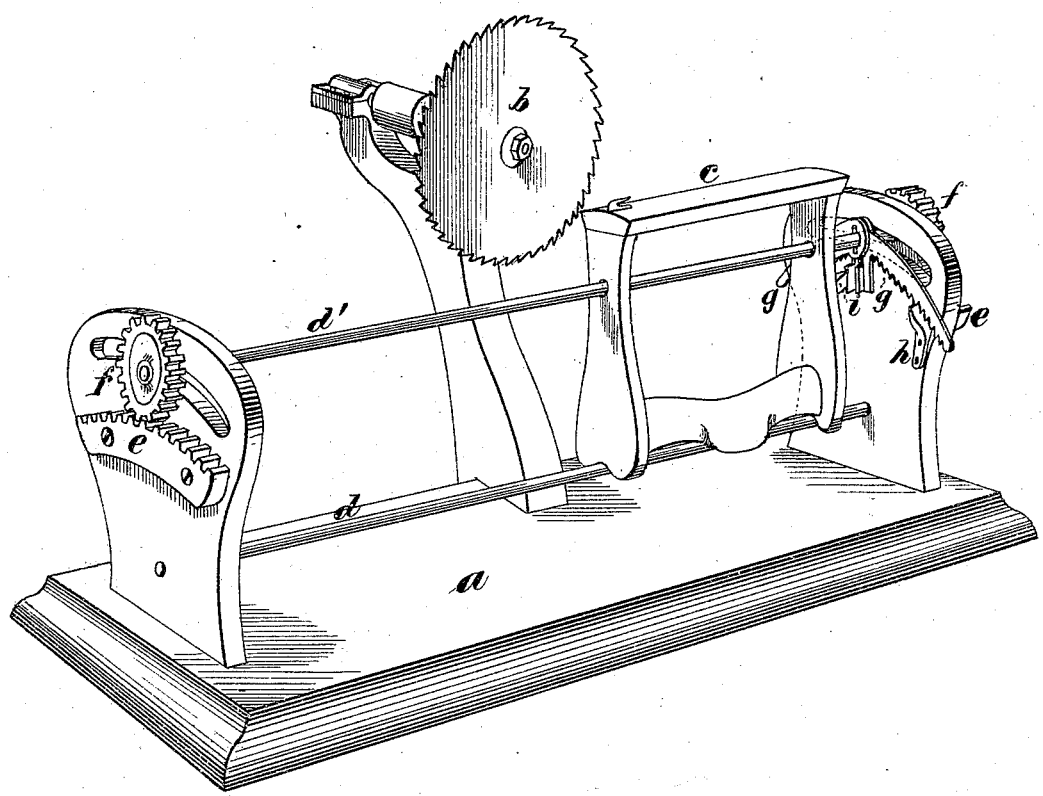
Witnesses:
Chas F. Gordon
Edward B. Shelden
Inventor:
William C. Perkins

UNITED STATES PATENT OFFICE.

WILLIAM C. PERKINS, OF STOCKTON, ASSIGNOR TO HIMSELF AND WILLIAM T. C. RUNNELLS, OF SEARSPORT, MAINE.

IMPROVEMENT IN MACHINES FOR JOINTING STAVES.

Specification forming part of Letters Patent No. 130,819, dated August 27, 1872.

I, WILLIAM C. PERKINS, of Stockton, in the county of Waldo and State of Maine, have invented a new and useful Machine for Jointing Staves; and I do hereby declare that the following is a full, clear, and exact description of the construction and operation of the same, reference being had to the annexed drawing making a part of this specification, in which—

Figure 1 is a perspective view.

Letter $a$, jointer-frame; $b$, saw; $c$, stave-table; $d$, stationary iron rod; $d'$, bilged or bent swinging and rotating iron rod; $e\ e$, racks; $ff$, pinions; $g\ g$, circular ratchets; $h\ h$, ratchet-dogs; $i$, chuck or ratchet lifter.

I make the jointer-frame $a$ of any convenient form, and lengthwise of it. I attach to it a stationary rod, $d$, and above said rod, in a direction with and at the requisite distance from it, I place a swinging and rotating rod, $d'$, as seen in the figure, which is bent similar to the bilge of a stave, the ends of which said rod $d'$ pass through and rest in the cog-wheels or pinions upon the ends of the frame, as shown by the figure; said rod $d'$ to be so adjusted that when brought directly over the rod $d$ its bilge or bent side shall be down. Upon and to said rods $d\ d'$ I attach a sliding table, $c$, upon which to place the staves to joint them, and at such distance from the lower rod $d$ that a stave placed upon said table shall be from the lower rod $d$ a distance equal to one-half the requisite bung diameter of barrels made of the staves thus jointed. I attach the racks $e\ e$ and the pinions $ff$ to the ends of the frame $a$, as shown by the figure— their office being to regulate the operation of the swinging rod $d'$ and to give to it the rotary motion requisite to bring its bilge toward the saw upon either side. I attach ratchets $g\ g$ to the rod $d'$, which fasten upon dogs $h\ h$ on the frame $a$ and hold the rod $d'$ firm and immovable while the table is passing the saw. I fasten the chuck or ratchet-lifter $i$ in the end of the table-frame or support. To the frame $a$, in a convenient and substantial manner, I attach my saw $b$, its position relative to the rods $d\ d'$ being above both, directly over the former and at the center of the bilge in the latter.

To operate this machine, draw the table $a$ back toward the ratchets $g\ g$; the chuck $i$ enters the arms of the ratchets and lifts the ratchets from the dogs $h\ h$, which permits the table $a$ and rod $d'$ to swing right and left; place the stave upon the table and swing it, say to the left of the saw; this turns the pinions $ff$, which, as they turn, roll the bilge of the rod $d'$ toward the saw, thus forming a track, crooked like the bilge of a stave, for the table to slide on. The foot of the table being held from turning by the rod $d$, which it slides on, the stave, as it is pushed by the saw, is forced to follow the direction of the upper rod $d'$, which direction is more or less curved or bilged as the bilge of the rod $d'$ is rolled further toward or from the saw, (as is done in sawing staves of different widths,) and the stave is edged with a corresponding bilge. To edge the other side of the stave, pull the table back; the chuck $i$ lifts and unfastens the ratchets as before; swing the table to the right; the pinions will turn the bilge of the rod $d'$ toward the saw upon that side, thus forming a track upon that side similar to that just described upon the other, upon which the table, with the stave on it, may be shoved by the saw with like results, thus producing corresponding bilges upon each side of the stave. The bevel of all staves thus jointed will always be cut exactly as required, as the saw always points and cuts toward the center or rod $d$, which may be regarded the center of a barrel, the stave when placed upon the table being just half the diameter of a barrel from it. If we consider the stave on the table one of the staves of a barrel thus encircling the lower rod $d$, said rod $d$ being the center, it will be seen that the saw always cuts toward the center however the barrel may be rotated.

The object of this invention is to secure a perfect and proportionate bilge and the requisite bevel upon all staves of whatever width, and save the labor of turning the stave end for end and replacing it upon the table.

By this machine the labor of jointing staves is greatly facilitated. By it both edges of a stave may be easily and properly jointed.

What I claim as my invention, and desire to secure by Letters Patent, is—

1. The swinging and rotating rod $d'$ in combination with table $c$, rod $d$, and saw $b$, substantially as and for the purpose specified.

2. The ratchets $g\ g$, ratchet-lifter $i$, pawls $h$, and rod $d'$, in combination with pinions $ff$ and racks $e\ e$, substantially as set forth.

WILLIAM C. PERKINS.

Witnesses:
CHAS. S. RENDELL,
L. M. PARTRIDGE.